Sept. 20, 1960     E. H. REPLOGLE ET AL     2,953,030
MOTION GENERATING MACHINE
Filed Jan. 15, 1957     4 Sheets-Sheet 1
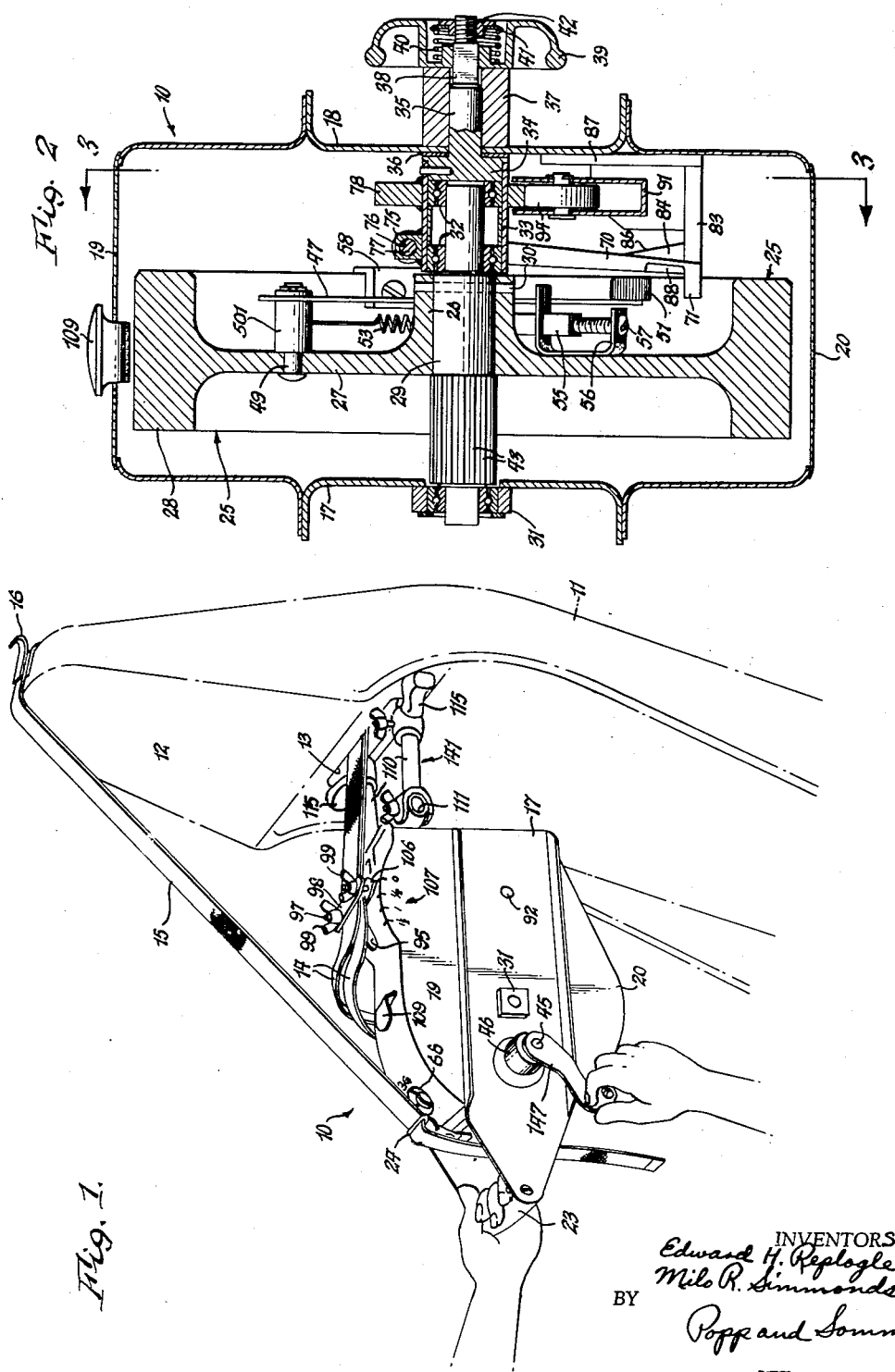
INVENTORS
Edward H. Replogle
Milo R. Simmonds
BY
Popp and Sommer
ATTORNEYS

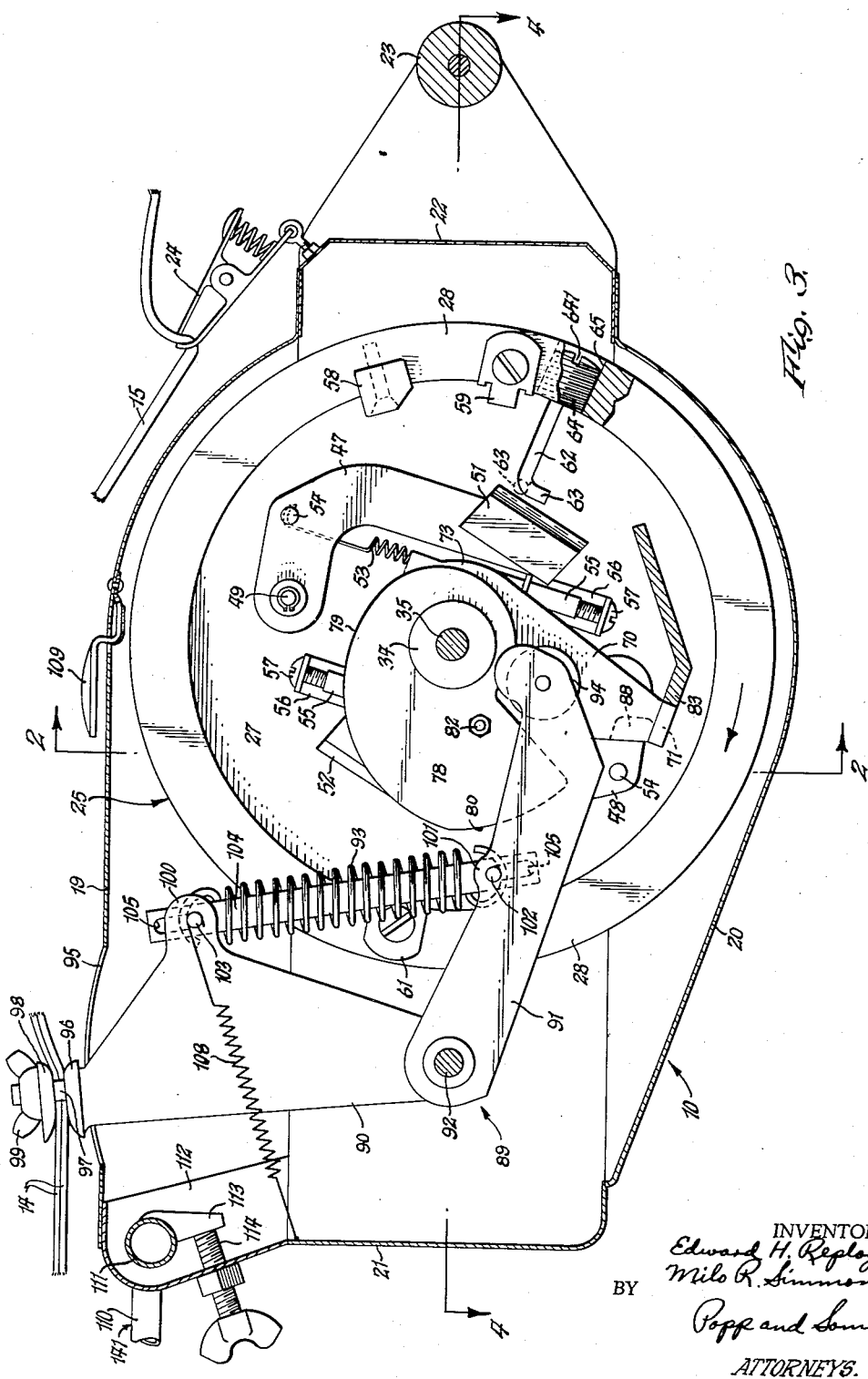

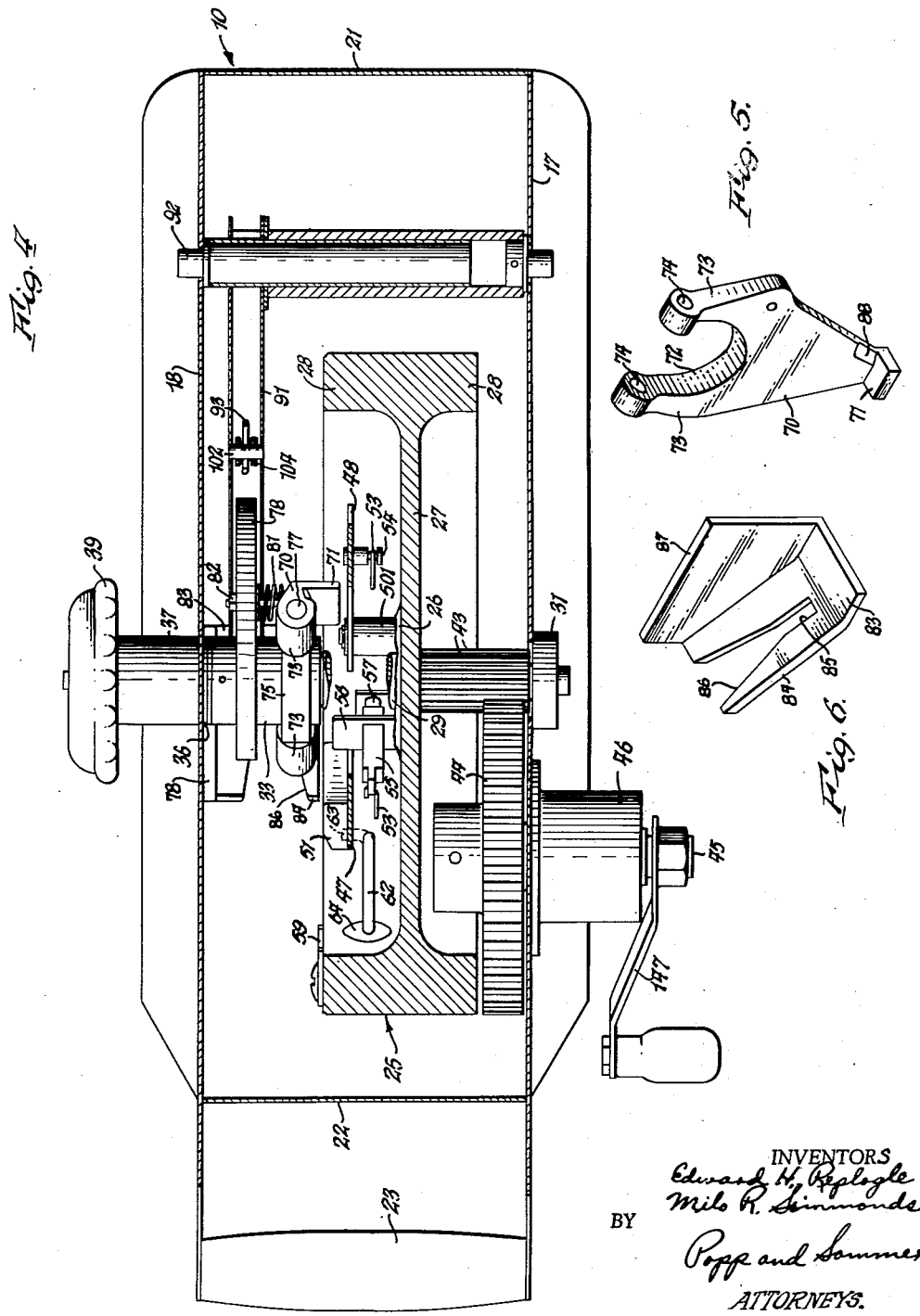

Sept. 20, 1960 E. H. REPLOGLE ET AL 2,953,030
MOTION GENERATING MACHINE
Filed Jan. 15, 1957 4 Sheets-Sheet 4

INVENTORS
Edward H. Replogle
Milo R. Simmonds
BY
Popp and Sommer
ATTORNEYS.

United States Patent Office 2,953,030
Patented Sept. 20, 1960

2,953,030
MOTION GENERATING MACHINE
Edward H. Replogle, 230 Getzville Road, Snyder, and Milo R. Simmonds, Williamsville, N. Y.; said Simmonds assignor to said Replogle Filed Jan. 15, 1957, Ser. No. 634,281
12 Claims. (Cl. 74—54)

This invention relates to a machine for generating a predetermined motion, and more particularly to a machine for testing an inertia reel associated with the straps which confine a pilot to his seat in an aircraft.

While the machine forming the subject of the present invention can be put to various uses, it has proven particularly advantageous in adaptation for use in testing an inertia reel of the type referred to while still mounted on the pilot's seat. Such an inertia reel is so constructed as to permit a cable attached to the pilot's shoulder straps to be relatively slowly pulled or unwound from the reel as when the pilot leans forward away from the back of his seat, but which cable is locked against unwinding when the pilot's body is forcefully thrown forward against the restraint of his shoulder straps as when the forward motion of the aircraft is rapidly decelerated. Specifications have been set up for limiting the amount of cable unwound from the reel when subjected to an acceleration within a predetermined range, usually expressed as a certain amount of cable travel, say ½ inch, when an acceleration of from between 2 and 3 times that of gravity is applied. Inertia reels which do not satisfy the prescribed specification are then repaired or replaced.

It is the primary object of the present invention to provide a machine for generating a predetermined motion and applying it to a motion responsive instrumentality, such as generating and applying a predetermined acceleration to the cable of an inertia reel so as to determine whether such reel meets the standards established for it.

Another object is to provide such a machine which tests the inertia reel while still mounted in the aircraft.

Another object is to provide a clutch operative to engage drive and driven members under conditions where the drive member is inoperative until it achieves a predetermined velocity.

Other objects are to provide a machine of the character described which is compact in size and relatively light in weight so as to permit it to be readily handled, which is comparatively simple in construction and not likely to get out of order or require repairs, and which can be manufactured at moderate cost.

Still other objects and advantages of the present invention will be apparent from the following description and accompanying drawings in which:

Fig. 1 is a perspective view of a testing machine embodying the present invention and showing the same mounted in operative position on a pilot's seat.

Fig. 2 is a vertical transverse sectional view, on an enlarged scale, through the machine shown in Fig. 1 and taken generally on line 2—2, Fig. 3.

Fig. 3 is a vertical longitudinal sectional view thereof, taken on line 3—3, Fig. 2.

Fig. 4 is a horizontal sectional view thereof, taken generally on line 4—4, Fig. 3.

Fig. 5 is a perspective view of the striker or driven member of the machine.

Fig. 6 is a perspective view of the cam stop adapted to co-operate with the striker shown in Fig. 5.

Figure 8:
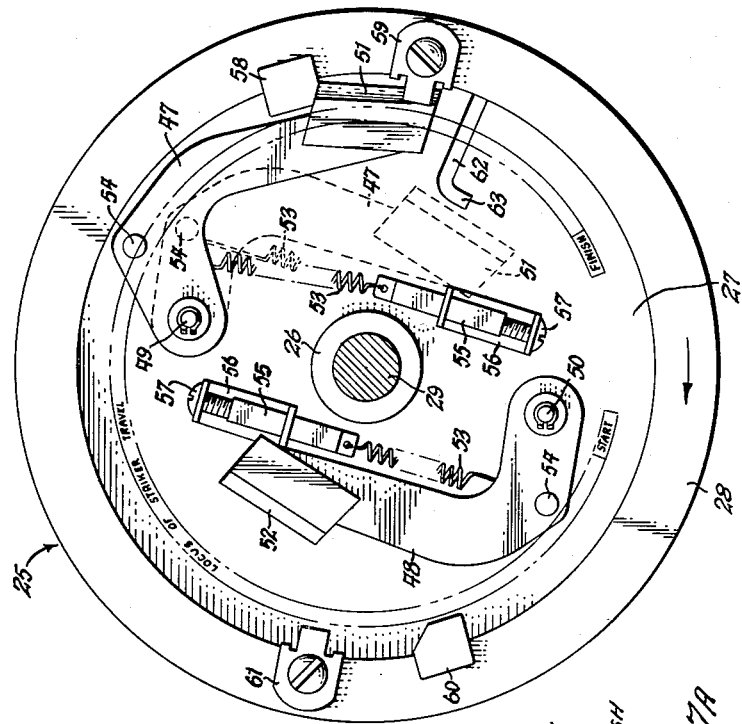
Fig. 8 is a view similar to Fig. 7 but showing the parts set up for operation to generate an acceleration twice that of gravity or 2Gs, the 2G drive member being illustrated in its outer operative position by full lines and in its inner inoperative position by broken lines.

Referring to Fig. 1, the inertia reel testing machine is represented generally by the numeral 10 mounted in testing or operative position on a pilot's seat fragmentarily indicated at 11. The pilot's seat is shown as having a forwardly projecting head rest portion 12 at its upper end below which a transverse opening 13 is provided. A pair of shoulder straps 14 are shown as issuing from the opening 13 and within the seat structure are joined together and connected to the cable of an inertia reel (not shown) to be tested. The function of the testing machine 10 is to apply a testing acceleration having a magnitude of either 2Gs or 3Gs to the shoulder straps 14.

The testing machine is supported on the seat in its operative position shown in Fig. 1 by an arm assembly 141 which co-operates with the opening 13 and surrounding part of the seat, and a support strap 15 one end of which is shown as provided with a hook 16 adapted to hook over the rear edge of the head rest 12 at the top thereof and the other end of which is adjustably connected to the front end of the testing machine.

The testing machine is shown as housed within a casing including a pair of longitudinally extending horizontal side frame members 17, 18, each of channel shape in cross section with its flanges turned outwardly, a top cover 19 having out-turned flanges suitably fastened to the side frame members, a bottom cover 20 also having out-turned flanges engaging the lower flanges of the side frame members and suitably fastened thereto, a rear end wall 21, and a front end wall 22. The webs of the side frame members 17 and 18 are shown as being formed with forwardly projecting triangular portions between which a transverse handle 23 is arranged and secured. This handle 23 permits one end of the machine to be steadied by the hand of the operator as illustrated in Fig. 1.

The lower end of the support strap 15 is shown as being adjustably connected to a clamp 24 of any desired construction suitably secured to the front end wall 22.

Rotatably arranged within the housing of the testing machine is a rotor or flywheel 25 having a hub 26, an integral radial web 27 and an outer annular weighted integral rim 28 which is shown as projecting laterally from opposite sides of the web 27. The hub 26 is made fast to a transverse horizontal shaft 29 in any suitable manner as by the pin 30. One end of the shaft 29 is journaled in an anti-friction bearing 31 suitably mounted on the exterior of the side frame member 17. The opposite end of the shaft 29 is journaled in a pair of axially spaced anti-friction bearings 32 supported in a tube 33.

The tube 33 is shown as pinned to the enlarged head 34 of a spindle 35 which projects horizontally outwardly through a bearing opening in the side frame member 18. The head 34 is shown as arranged within the machine housing and adjacent the inner surface of the side frame member 18. The opposing faces of the head 34 and side frame member 18 are parallel and spaced apart by a washer 36. Surrounding the portion of the spindle immediately outside the side frame member 18 is a tubular cylindrical spacer 37. The spindle 35 has an outer reduced portion 38, out of round in cross section, on which the hub of a knob 39 is axially slidably but non-rotatively mounted.

The knob 39 is shown as having an inwardly facing vertical face adapted to engage the outer end face of the spacer 37. These faces are urged together by a helical compression spring 40 arranged in a recess in the knob 39. The inner end of the spring 40 bears against the knob 39 and the outer end bears against a retainer ring 41 carried by a nut 42 screwed on to the threaded outer extremity of the spindle 35. By adjusting the nut 42 and thereby the load on the spring 40 it will be seen that the outer face of the enlarged head 34 on the spindle can be drawn against the washer 36 so as to provide a high and adjustable frictional resistance to rotation of the tube 33. Also, since the knob 39 rotates with the spindle 35 frictional resistance to turning is provided by the spacer 37.

That portion of the shaft 29 between the hub 26 and the bearing 31 is shown as being machined to provide gear teeth 43 engaged by a drive gear 44 mounted on a horizontal shaft 45 arranged forward of the shaft 29 and suitably journaled in a bearing 46 suitably mounted on the side frame member 17. The outer end of the shaft 45 exterior of the machine casing has fast thereto a crank 147 adapted to be manually turned as illustrated in Fig. 1. By turning the crank 147 in a clockwise direction as viewed in Fig. 1, it will be seen that the rotor or flywheel 25 will be rotated in a clockwise direction as viewed in Figs. 3, 7 and 8. The gear ratio between the elements 43 and 44 is such as to rotate the rotor or flywheel 25 at a higher r.p.m. than for the crank shaft 45.

The rotor or flywheel 25 is shown as carrying a pair of drive members 47, 48 pivotally arranged on the web 27 on the inner side thereof and within the confines of the inner axially projecting flange portion of the rim 28 of the flywheel or rotor. The drive members 47, 48 are each in the form of a generally L-shaped arm. The pivot pin for the drive member or arm 47 is shown at 49 and a spacer 501 surrounding this pin holds the member 47 in spaced relation to the web 27. The pivot pin for the drive member or arm 48 is shown at 50 and a similar spacer holds this member in proper spaced relation to the web 27. The pivot pins 49 and 50 are arranged on diametrically opposite sides of the shaft 29 and adjacent the outer end of the short leg of the respective drive member or arm 47, 48 and the axes of these pins are parallel to the axis of the shaft 29. The outer or free end of the drive member or arm 47 is shown as carrying a weighted block 51 suitably fixedly mounted thereon. A similar block 52 is secured to the outer end of the other drive member or arm 48.

Associated with each drive member or arm 47, 48 is an adjustable spring assembly for urging the respective arm to an inner inoperative position as shown in Fig. 3. Each such spring assembly includes a tension helical spring 53 one end of which is suitably connected to the respective arm 47 or 48 intermediate the ends thereof and adjacent the pivot pin 49 or 50 as by being hooked over an anchor pin 54 carried by the arm. The opposite end of the spring 53 is suitably connected to an elongated nut 55 the exterior of which is shown as being square in cross section and extending through one flange of a U-shaped bracket 56 suitably fastened to the web 27 adjacent the hub 26. The other flange of the bracket 56 has extending through a hole therein the threaded shank of an adjusting screw 57 the inner end of which is received in the threaded recess of the nut 55. By turning the screws 57 it will be seen that the corresponding springs 53 can be pretensioned to the degree desired.

It will be noted that the spring 53 for each arm 47 or 48 is connected thereto at a point past dead center for the lever arm for the force exerted by the spring so that even though the spring may stretch, a substantially constant torque is applied to return each of the arms to its inner inoperative position.

The arm 47 with its weighted block 51 are so proportioned that when centrifugal force acts upon this arm and block to swing the arm outwardly or in a counter clockwise direction about the axis of the pivot 49 as shown in Fig. 3, the trailing end of the block 51 comes to rest against the beveled surface of a stop 58 suitably secured as by a radial screw to the inner surface of the rim 28 of the rotor or flywheel 25. The outer operative position of the arm 47 and block 51 is shown by full lines in Fig. 8. A retainer plate 59 is secured as by a screw to the inner axial face of the rim 28 forward of the stop 58 and extends radially inwardly so as to extend along the side of the block 51 and assist in maintaining the position of this block against the stop 58.

Figure 7:
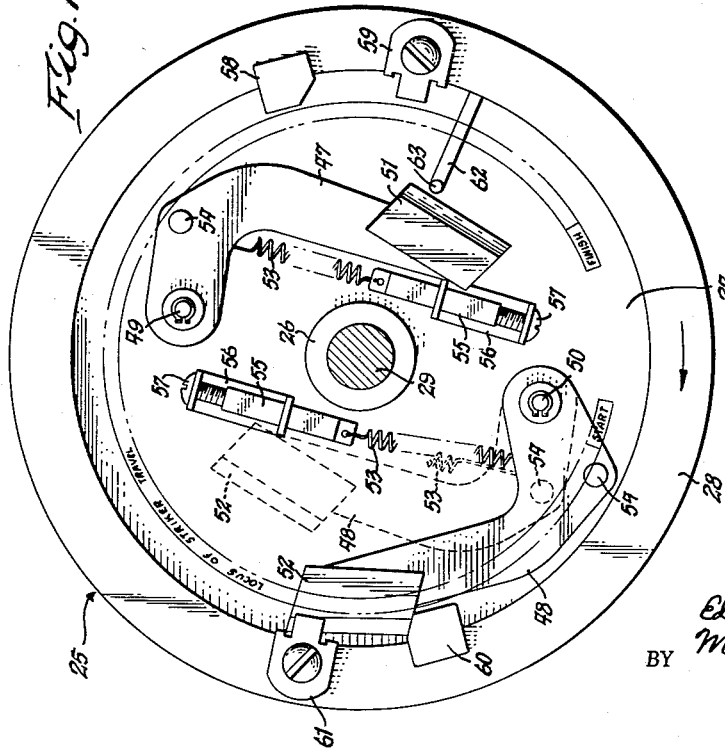
Fig. 7 is a view similar to Fig. 3 but showing only the rotor or flywheel and drive members mounted thereon, set up for operation to generate an acceleration three times that of gravity or 3Gs, and showing the 3G drive member in full lines in its outer operative position and by broken lines in its inner inoperative position.

A similar stop 60 and retainer plate 61 are provided for the block 52 on the other drive member or arm 48 whose outer operative position is shown by full lines in Fig. 7.

The springs 53 for the arms 47 and 48 resist the outward swing of their respective arms with which they are associated and are individually adjusted so that the spring 53 for the arm 48 has a greater amount of pre-tension than the spring 53 for the arm 47. This is for the reason that it is desired that the arm 47 tend to swing outwardly from its inner inoperative position to its outer operative position by centrifugal action when the rotor or flywheel 25 attains a predetermined angular velocity which can be utilized to generate an acceleration of 2Gs, as hereinafter explained, whereas the tighter spring 53 for the arm 48 will not permit the arm 48 to swing outwardly to its operative position until a greater angular velocity is attained by the flywheel in order to generate an acceleration corresponding to 3Gs. In short, the arm 47 swings outwardly at a relatively lower angular velocity of the rotor or flywheel to generate a 2G acceleration and the arm 48 swings outwardly at a relatively higher angular velocity of the rotor or flywheel to generate a 3G acceleration.

In order to prevent the arm 47 from swinging to its outer operative position when a 3G acceleration is called for, a stop 62 is associated with the block 51 on the arm 47. This stop 62 is in the form of an L-shaped rod having a leg radially arranged between the block 51 and web 27 as shown in Fig. 4. The inner end of this rod is bent to provide a foot 63 adapted to overlay the outer face of the block 51. The outer end of the rod is suitably mounted on an externally threaded enlarged head 64 received in an internally threaded radially extending hole 65 provided in the inner flange portion of the rim 28 of the rotor or flywheel 25. The head 64 has a screw driver slot 641 in its outer end which is accessible through a hole 66 provided in the top cover 19.

When the stop is turned to a position where the foot 63 extends across the outer face of the block 51, it will be seen that the arm 47 is prevented from swinging outwardly. However, when the stop 62 is turned so as to adjust the foot 63 to avoid interference with the block 51, as when this foot extends along the inner side of this block, the arm 47 is free to swing outwardly.

For the convenience of the operator a mark and legend "3G" is placed on the top cover 19 adjacent the access hole 66 so as to align with the slot 641 in the head 64 when the stop 62 is in a position to prevent outward movement of the arm 47, and a similar mark and legend "2G" is placed on the top cover so as to align with said slot when the stop 62 is in a position to permit the arm 47 to swing outwardly.

Either block 51 or 52, when its respective arm 47 or 48 is in its outer operative position, is adapted to engage a driven member or striker 70. As best shown in Fig. 5, this striker 70 is a one-piece plate member having a laterally extending head 71 at one end and at its other end is provided with a U-shaped recess 72 to form a pair of arms 73 the extremities of which are shown as enlarged and provided with aligned holes 74. This recess is large enough to receive the tube 33 without contact.

The striker 70 is pivotally mounted on this tube 33 and for this purpose the tube carries a bearing block 75 suitably secured on the exterior thereof as by welding and having a journal opening 76 therethrough which extends parallel to a tangent to the tube 33. The arms 73 embrace the ends of the block 75 and the opening 76 aligns with the holes 74 in the striker. A pivot pin 77 extends through such registered opening and holes.

The driven member or striker 70 is arranged so that the head 71 on its outer end projects toward the rotor or flywheel 25. The head 71 is disposed inwardly of the flange 28 on the rotor and in the path of the leading faces of the blocks 51 and 52 on the respective drive members 47 and 48 when the latter are in their outer operative positions. When engaged by either block 51 or 52, the striker 70 which extends outwardly from the tube 33 as an arm therefor, rotates this tube.

Also arranged on and fast to the tube 33 as by welding is an acceleration cam 78, which is arranged to translate angular velocity of the flywheel or rotor 25 into radial acceleration of a follower at a predetermined rate. This cam is shown as a plate spaced axially outwardly from the striker 70 on the tube 33 and has a peripheral cam working face including a progressively radially enlarging acceleration section 79 having a circumferential extent of about 270 degrees and a trailing dwell section 80 of constant radius.

The acceleration section 79 is so designed that the radial distances at different cirmumferentially spaced intervals thereon to the axis of rotation of the cam 78, i.e. the cam ordinates, are such as to produce a predetermined acceleration for a given angular velocity imparted to the cam. Distance, acceleration and time are related to each other according to the equation $S = \frac{1}{2}at^2$ in which S is displacement, $a$ is acceleration and $t$ is time. In applying the principle of this well known equation to the cam 78, displacement is the rise in cam section 79 or dimensional difference in radial ordinates at the beginning and end of a given angular travel of the cam 78 which requires a finite time. Once the cam profile is determined to produce a given acceleration, say 3Gs, for a given angular velocity of the cam 78, a different acceleration can be produced by controlling the angular velocity of the cam. Thus, by rotating the cam 78 at a slower angular velocity a lower acceleration, say 2Gs, can be produced.

Interposed between the cam 78 and striker 70 is a spring 81 which serves to bias the striker toward the rotor or flywheel 25 about the axis of the pivot pin 77. Separation of the cam and striker is limited by a nut and bolt assembly 82 which extends through registered holes in these members and which is surrounded by the spring 81.

Normally the trailing end of the head 71 of the striker abuttingly rests against the heel 83 of a stop 84. This stop 84, as shown in Fig. 6, has a recess 85 opening to the toe end of the stop and which flares outwardly to provide a cam face 86. A side plate 87 on the stop 84 serves to mount the same on the inside of the side wall of the machine casing and is secured thereto in any suitable manner. The leading corner of the striker immediately inwardly of the head 71 thereof is beveled as shown at 88 in Fig. 5 to facilitate engagement between the striker and cam face 86. Such engagement serves to withdraw the striker head 71 from engagement with either the block 51 or 52 after the striker has been turned about the axis of the tube 33 almost a complete revolution.

Means are provided for transmitting or applying the acceleration generated by the cam 78 to the shoulder straps 14. Such means include a bellcrank lever assembly indicated generally at 89 and comprising an arm 90, a cam follower arm 91, both pivotally mounted on the transverse pivot pin 92 and connected by a spring 93. The pivot pin 92 in suitably mounted at its ends on the side walls of the machine casing. The cam follower arm 91 is shown as extending generally horizontally and as being channel shaped in cross section with its open side facing upwardly. One end of the arm 91 is mounted on the pivot pin 92 in any suitable manner and the other end carries a roller 94 whose periphery rides on the cam face of the cam 78. The roller or cam follower 94 engages the cam 78 below the axis of rotation of the same as best shown in Fig. 3.

The arm 90 is shown as extending generally vertically with its upper end projecting through an opening 95 in the top cover 19. A lower transverse bar 96 is carried by the upper end of the arm 90 exterior of the top cover and this bar in turn carries a pair of transversely spaced upstanding externally threaded studs 97. The shoulder straps 14 pass over the bar 96 and are releasably clamped thereto by an upper clamping bar 98 having holes receiving the studs 97 and wing nuts 99 arranged on these studs above the upper bar 98.

The lower end of the generally vertical arm 90 is suitably mounted on the pivot pin 92 alongside the cam follower arm 91 and has a forwardly projecting and thence laterally offset intermediate portion terminating in a pair of transversely spaced ears 100 which substantially vertically align with a pair of ears 101 upstanding on the cam follower arm 91. The ears 101 are intermediate the ends of the arm 91 and carry a transverse anchor pin 102. A similar transverse anchor pin 103 is arranged between the ears 100. The ends of the helical spring 93 which is under tension are shown as being formed with hooks to engage the anchor pins 102 and 103 respectively. In order to prevent the arms 90 and 91 from closing the angle between them beyond a predetermined amount, a pair of strut bars 104 are shown as arranged within the confines of the coil spring 93. These bars 104 have elongated longitudinally extending closed slots 105 adjacent each end to receive the corresponding anchor pin 102, 103.

Inasmuch as the spring 93 is under tension the anchor pins 102 and 103 will be pulled toward each other until these pins engage the inner ends of the slots 105 in the strut bars. When the parts are in this condition the force exerted by the spring 93 is greater than the resistance to slow pulling out of the shoulder straps 14 and hence the resistance to slow unwinding of the inertia reel (not shown) to which these straps are connected. However, the arms 90 and 91 are free to swing away from each other about the axis of the pivot pin 92, against the urging of the spring 93, until the anchor pins 103 bottom in the outer ends of the slots 105 in the strut bars 104.

Referring to Fig. 1, the outer end of the lower bar 96 to which the shoulder straps 14 are clamped is shown as formed to provide a pointer 106 adapted to traverse a scale indicated at 107 on the top cover 19. This scale 107 is preferably graduated in one-half inch intervals and is for the purpose of measuring the distance through which the shoulder straps move when accelerated before the inertia reel locks up.

The bellcrank lever assembly 89 is preferably normally urged to a position, counterclockwise as viewed in Fig. 3, so as to maintain the roller 94 in engagement with the peripheral cam face of the cam 78, by any suitable means. For this purpose a spring 108 is shown as interposed between the arm 90 and the machine casing or frame.

A manually depressable brake 109 is shown for stopping rotation of the rotor or flywheel 25. This blade 109 is arranged on the top of the machine and is adapted when depressed to engage frictionally the periphery of the rim 28 of the rotor. Any other suitable braking means may be employed.

Referring to Fig. 1, the arm assembly 141 for mounting the machine on the pilot's seat is shown as comprising a pair of arms 110 suitably pivotally mounted on the outer ends of a transverse rod 111 so as to be swingable about parallel axes which extend diametrically of the rod 111. This rod 111 is suitably rotatively mounted as in the bracket 112 (Fig. 3), and has a rigid radially outwardly extending stop arm 113 adapted to engage an adjustable stop 114 when the arms 110 are substantially horizontal. The outer ends of these arms 110 are preferably formed to hook onto the inner surface of the seat adjacent the opening 13 therein and are preferably held in this position by adjustable retainers 115 mounted on the arms 110 and having portions bearing against the outer surface of the seat adjacent the opening 13. When the machine is not in its testing position the arm assembly 141 can be turned down about the axis of the transverse rod so that the arms 110 lie adjacent the rear end wall 21 of the machine.

*Operation*

The testing machine is installed on the pilot's seat in the manner illustrated in Fig. 1 and as described hereinabove. The shoulder straps 14 are clamped to the bellcrank lever assembly 89. These straps will be under a slight tension, say in the order of 4 pounds, exerted by the rewind spring of the inertia reel (not shown) to be tested.

The ability of the inertia reel to lock up when the shoulder straps 14 are forwardly accelerated at 3Gs and also at 2Gs is to be tested and measured by the displacement of the straps before they are stopped.

In order to make the 3G acceleration test, the operator turns the crank 147 until the screwdriver slot 641 appears in the access hole 66. With a suitable tool such as a screwdriver, the operator can align the slot 641 with the 3G mark. This will position the foot 63 of the stop 62 across the block 51 so as to restrain this block and its supporting arm 47 against outward movement. Such position of the stop 62 is shown in Fig. 7.

The operator turns the knob 39 so as to cause the striker 70 to abut the heel 83 of the cam stop 84, as shown in Fig. 3.

Figure 7A:
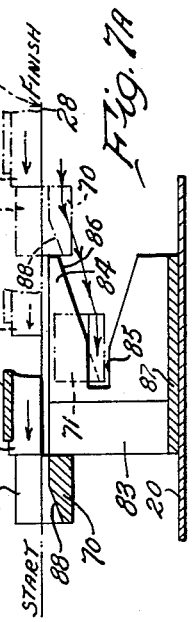
Fig. 7A is a horizontal, fragmentary, sectional view through the machine looking down on the cam stop and depicting the relation of the striker to the cam stop and also to a drive member mounted on the rotor.

Thereafter the operator turns the crank in a clockwise direction as viewed in Fig. 1 so as to rotate through the gearing 44, 43, the rotor or flywheel 25 in a clockwise direction as viewed in Figs. 3 and 7. A brief interval of progressively faster crank rotation will be required for the operator to build up the speed of the rotor or flywheel 25 so that it will attain a predetermined angular velocity. However, when such predetermined angular velocity is attained centrifugal force acting upon the block 52 and the arm 48 will cause the same to swing outwardly about the axis of its pivot 50 in a counterclockwise direction as viewed in Figs. 3 and 7, against the urging of the associated restoring spring assembly. The outward displacement of the block 52 to the operative position shown by full lines in Fig. 7 will place the block 52 in a path of travel which will interfere with the striker head 71. The leading face of the block 52 will abuttingly engage the striker head 71 as depicted by full lines in Fig. 7A and transmit the angular velocity of the rotor or flywheel 25 to the striker 70. This engagement causes the striker 70 to rotate the tube 33 on which the acceleration cam 78 is mounted. Thus the angular velocity of the rotor or flywheel 25 is transmitted to the acceleration cam 78. This cam rotates in a clockwise direction as viewed in Fig. 3 and displaces the bellcrank lever assembly 89 in a clockwise direction about its pivot pin 92. Inasmuch as the shoulder straps 14 are clamped to the upper end of the arm 90, the acceleration generated by the cam 78 will be transmitted and applied to the shoulder straps.

So that the cam follower 94 can continue to ride on the acceleration section 79 after the inertia reel has locked up to prevent further outward displacement of the shoulder straps, the cam follower arm 91 is caused to swing in a clockwise direction as viewed in Fig. 3 away from the now stationary arm 90 against the urging of the spring 93. It is pointed out that the cumulative lengths of the slots 105 in the strut bars 104 are such as to accommodate the greatest cam ordinate of the cam 78 even should there be no initial movement of the arm 90.

The striker 70 is rotated less than one complete revolution. As this striker moves from the initial position shown in Fig. 3 to a position where it enters the recess 85 in the cam stop 84, the beveled surface 88 on the striker engages the cam surface 86 on the cam stop. This engagement operates to withdraw the striker head 71 from the path of the outwardly displaced block 52 and hence withdraw the striker from engagement with this block. This sequence of action for the striker 70 and block 52 is depicted by broken lines in Fig. 7A. The frictional resistance to rotation of the tube 33 as well as that afforded by the engagement of the beveled surface 88 with the cam face 86, serve to decelerate rapidly and stop the striker after it has disengaged the block 52. This cumulative frictional resistance will hold the cam 78 in its stopped position short of bottoming in the slot 85.

The length of travel or displacement of the shoulder straps 14 can be read on the scale 107 which is graduated at ½ inch intervals.

It will be noted that rotation of the rotor or flywheel 25 will continue after the striker and block 52 disengage. This rotation can be terminated by depressing the brake 109 which will slow down the rotor or flywheel 25 and eventually stop it. As rotation slows down the spring restoring assembly will return the arm 48 to its inner inoperative position.

The inertia reel is adapted to be released from its locked up condition by means not shown so as to permit it to apply a light retraction force on the shoulder straps.

In order to set up the machine for testing the inertia reel for forward acceleration of the shoulder straps 14 at a 2G rate, the operator turns the knob 39 so as to turn the spindle 35, tube 33, cam 78 and striker 70 in a counterclockwise direction as viewed in Fig. 3 until the striker 70 reengages the heel 83 of the cam stop 84. Return of the cam 78 to the starting position shown in Fig. 3 will also return the bellcrank lever assembly 89 to the position shown in Fig. 3.

The operator then brings the slot 641 into accessibility through the hole 66 and turns the stop 62 so as to align the slot with the 2G mark. This swings the foot 63 of this stop to the position along the side of the block 51 as shown in Fig. 8 and wherein there will be no hindrance to the outward movement of this block and the arm 47. The operator now turns the crank 147 again in a clockwise direction as viewed in Fig. 1 until the rotor or flywheel 25 achieves a predetermined angular velocity, now less than that for the previous test, which will cause through centrifugal action the block 51 and arm 47 to swing outwardly into the full line position shown in Fig. 8, against the urging of its associated spring restoring assembly. When the leading face of the block 51 engages the striker head 71, the peripheral velocity of the rotor or flywheel 25 will be transmitted to the striker 70 and thence to the cam 78. The turning of the cam 78, now at a lower peripheral velocity, will permit this cam to generate an acceleration corresponding only to 2Gs. This 2G acceleration is transmitted through the bellcrank lever assembly 89 to the shoulder straps 14 in the same manner as previously described.

The amount of outward pulling or displacement of the shoulder straps 14 before the inertia reel locks up can be read on the scale 107.

It will be seen that the testing at either the 2G or 3G acceleration rate can be repeated as often as desired and will determine whether the particular inertia reel being tested falls within the permissible displacements allowed.

An important feature of the present invention is that it provides a clutch between driving and driven members which is operative only when the driving member attains a predetermined angular velocity. While such velocity is utilized in the specific embodiment of the invention illustrated to rotate a cam designed to generate a certain acceleration rate, it will be understood that a clutch of this type may be associated with other mechanisms for useful purposes.

It is also important to note that the driving members are preferably rotated in a vertical plane so that the effect of gravity upon the weighted free ends of these members can be utilized to assure that the driving member will be in its full outer and operative position before engaging the driven member. More specifically, it will be seen that when the weighted free end is at that critical point where it wants to swing outwardly under the influence of centrifugal force and it enters the lower part of its arc of travel, gravity will cause the driving member to begin to swing outwardly and as soon as this commences the centrifugal effect increases and assures continued outward movement of the driving member to the limit of its operative position. Inasmuch as a finite time is required for the driving member to move from its inner inoperative position to its outer operative position and such movement begins at about the bottom of the rotor, the initial or starting position of the striker or driven member 71 is located so as to be passed over by the driving member before it reaches its full outer operative position. In other words, the weighted end of the driving member arrives at its fully seated outer operative position just after it has passed the driven member. Thus a substantially complete single revolution of the driving member while in its full operative position, is assured before engaging the driven member. This arrangement avoids haphazard and unpredictable movement of the driving member from its inner to its outer positions which might bring the driving member into engagement with the driven member before the driving member has fully reached its outermost operative position.

It will be apparent to those skilled in the art that various modifications and alterations can be made in the specific machine illustrated without departing from the spirit of the invention, and hence the present invention is to be measured by the scope of the appended claims and not limited to the specific embodiment illustrated.

We claim:

1. In a machine of the character described, a clutch comprising a fly wheel having a laterally projecting rim portion, means for rotating said flywheel, a drive member having an arm and weighted end portion within the confines of said rim portion, means pivotally mounting said arm on said flywheel at a location remote from said weighted end for pivotal movement about an axis parallel to that of said flywheel, said drive member being adapted to swing outwardly under the action of centrifugal force to an operative position when said flywheel attains a predetermined angular velocity and in which position said weighted end portion is seated on said rim portion, a stop on said flywheel and engaging a trailing face on said weighted end portion when seated in the said operative position of said member, yielding means operatively interposed between said member and flywheel and arranged to urge said member to an inner inoperative position, and a driven member rotatively mounted coaxially with said flywheel and having a portion projecting into the confines of said rim portion and arranged to avoid engagement with said drive member when the latter is in said inoperative position but being in the path of travel of said weighted end portion when said drive member is in said operative position thereby to be abuttingly engaged by a leading face on said weighted end portion.

2. In a machine of the character described, a clutch, comprising a flywheel having a laterally projecting rim portion, means for rotating said flywheel, a drive member having an arm and weighted end portion within the confines of said rim portion, means pivotally mounting said arm on said flywheel at a location remote from said weighted end for pivotal movement about an axis parallel to that of said flywheel, said drive member being adapted to swing outwardly under the action of centrifugal force to an operative position when said flywheel attains a predetermined angular velocity and in which position said weighted end portion is seated on said rim portion, yielding means operatively interposed between said member and flywheel and arranged to urge said member to an inner inoperative position, a driven member rotatively mounted coaxially with said flywheel and including a striker mounted for pivotal movement about an axis extending transversely of said first mentioned axis, said striker having a portion projecting into the confines of said rim portion and arranged to avoid engagement with said drive member when the latter is in said inoperative position but being in the path of travel of said weighted end portion when said drive member is in said operative position thereby to be abuttingly engaged by said weighted end portion, and means for withdrawing said striker from engagement with said drive member including a cam arranged to engage said striker.

3. In a machine of the character described, a clutch, comprising a rotor, means for rotating said rotor, a first drive member arranged for pivotal movement about an axis parallel to that of said rotor and adapted to swing outwardly about said axis to an operative position under the action of centrifugal force when said rotor attains a first predetermined angular velocity, a second drive member arranged for pivotal movement about an axis parallel to that of said rotor and adapted to swing outwardly about such axis to an operative position under the action of centrifugal force when said rotor attains a second predetermined angular velocity which is greater than said first angular velocity, means mounting said drive members with their said pivotal axes on diametrically opposite sides of the rotor axis, yielding means operatively arranged between each of said drive members and said rotor and arranged to urge each of said members to an inner inoperative position, releasable means for restraining outward movement of said first drive member, and a driven member rotatively mounted coaxially with said rotor and arranged to avoid engagement with both said drive members when they are in their said inoperative positions but adapted to be engaged by either one when in its said operative position whereby its angular velocity is transmitted to said driven member.

4. In a motion generating machine, the combination comprising a rotor, means for rotating said rotor, a drive member pivotally mounted on said rotor for pivotal movement about an axis parallel to that of said rotor and adapted to swing outwardly about said axis to an operative position under the action of centrifugal force when said rotor attains a predetermined angular velocity, yielding means arranged to urge said member to an inner inoperative position, a driven member rotatively mounted coaxially with said rotor and arranged to avoid engagement with said drive member when the latter is in said inoperative position but adapted to be engaged by said drive member when in said operative position, a rotatable cam arranged to rotate with said driven member and having a working face, and a movable follower engaging said face, said face being arranged to impart a predetermined motion to said follower when said drive member is in said operative position to rotate said driven member and cam.

5. In a motion generating machine, the combination comprising a rotor, means for rotating said rotor, a drive member pivotally mounted on said rotor for pivotal movement about an axis parallel to that of said rotor and adapted to swing outwardly about said axis to an operative position under the action of centrifugal force when said rotor attains a predetermined angular velocity, yielding means arranged to urge said member to an inner inoperative position, a driven member rotatively mounted coaxially with said rotor and arranged to avoid engagement with said drive member when the latter is in said inoperative position but adapted to be engaged by said drive member when in said operative position, a rotatable cam arranged to rotate with said driven member and having a working face, a movable follower engaging said face, said face being arranged to impart a predetermined motion to said follower when said drive member is in said operative position to rotate said driven member and cam, and means for disengaging said members after said driven member and cam have rotated less than one complete revolution.

6. In a machine of the character described, the combination comprising a rotor, means for rotating said rotor, a drive member pivotally mounted on said rotor for pivotal movement about an axis parallel to that of said rotor and adapted to swing outwardly about said axis to an operative position under the action of centrifugal force when said rotor attains a predetermined angular velocity, yielding means arranged to urge said member to an inner inoperative position, a driven member mounted for rotative movement coaxially with said rotor and also mounted for pivotal movement about an axis extending transversely of the rotor axis and arranged to avoid engagement with said drive member when the latter is in said inoperative position but adapted to be engaged by said drive member when in said operative position, a stop engaged by said driven member when in its normal initial rest position, a cam arranged to rotate with said driven member and having a working face, a follower engaging said face, said face being arranged to impart a predetermined motion to said follower, and a disengage cam arranged to disengage said drive and driven members after said driven member and cam have rotated less than one complete revolution.

7. The combination as set forth in claim 4 in which said follower comprises a bellcrank lever assembly including two relatively movable arms arranged at an angle to each other, the free end of one of said arms engaging said cam face and the free end of the other of said arms being adapted for connection to an instrumentality to which a predetermined motion is to be imparted, yielding means urging said arms so as to close the angle therebetween, and means limiting the maximum and minimum angle between said arms.

8. In a motion generating machine, a clutch, comprising a rotor, a drive member pivotally mounted on said rotor and adapted to swing outwardly under the action of centrifugal force from an inner inoperative position to an outer operative position when said rotor attains a predetermined angular velocity, a stop on said rotor and arranged to be engaged by said drive member when in said outer position, and a driven member rotatively mounted coaxially with said rotor and arranged to avoid engagement with said drive member when the latter is in its said inner position but having a portion in the path of travel of said drive member when the latter is in its said outer position, whereby said portion is struck in a generally tangential direction by said drive member.

9. In a motion generating machine, a clutch, comprising a flywheel, a drive member pivotally mounted on said flywheel and having a weighted portion adapted to swing outwardly under the action of centrifugal force from an inner inoperative position to an outer operative position when said flywheel attains a predetermined angular velocity, a stop on said flywheel and arranged to be engaged by the trailing side of said weighted portion when in said outer position, and a driven member rotatively mounted coaxially with said flywheel and arranged to avoid engagement with said drive member when said weighted portion thereof is in its said inner position but having a portion in the path of travel of said weighted portion when the latter is in its said outer position, whereby said portion of said driven member is struck in a generally tangential direction by the leading side of said weighted portion.

10. In a motion generating machine, a clutch, comprising a flywheel, a drive member having an arm and weighted end portion, means pivotally mounting said arm on said flywheel at a location remote from said weighted end portion for pivotal movement about an axis parallel to that of said flywheel, said drive member being adapted to swing outwardly under the action of centrifugal force to an operative position when said flywheel attains a predetermined angular velocity, a stop on said flywheel and arranged to be engaged by the trailing side of said weighted end portion when said drive member is in said operative position, yielding means operatively interposed between said drive member and flywheel and arranged to urge said drive member to an inner inoperative position, and a driven member rotatively mounted coaxially with said flywheel and arranged to avoid engagement with said drive member when the latter is in said inoperative position but having a portion in the path of travel of said weighted end portion when said drive member is in said operative position, whereby said portion of said driven member is struck in a generally tangential direction by the leading side of said weighted end portion.

11. A clutch as set forth in claim 10 in which the axes of said flywheel and drive and driven members are horizontal, and the starting position of said portion of said driven member is within the first and lower quadrant of movement in advance of a vertical line which extends through the pivotal axis of said drive member and the center of gravity of said weighted end portion thereof.

12. In a motion generating machine, a clutch, comprising a flywheel, a drive member having an arm and weighted end portion, means pivotally mounting said arm on said flywheel at a location remote from said weighted end portion for pivotal movement about an axis parallel to that of said flywheel, said drive member being adapted to swing outwardly under the action of centrifugal force to an operative position when said flywheel attains a predetermined angular velocity, a stop on said flywheel and arranged to be engaged by said weighted end portion when said drive member is in said operative position, yielding means operatively interposed between said drive member and flywheel and arranged to urge said drive member to an inner inoperative position, a driven member rotatively mounted coaxially with said flywheel and including a striker mounted for pivotal movement about an axis extending transversely of the first mentioned axis, said striker having a portion arranged to avoid engagement with said drive member when the latter is in said inoperative position but being in the path of travel of said weighted end portion when said drive member is in said operative position thereby to be abuttingly engaged by said weighted end portion, and means for withdrawing said striker from engagement with said drive member including a cam arranged to engage said striker.

References Cited in the file of this patent

UNITED STATES PATENTS

| | | |
|---|---|---|
| 918,574 | Mayo et al. | Apr. 20, 1909 |
| 1,139,566 | Ogburn | May 18, 1915 |
| 1,739,298 | Ford | Dec. 10, 1929 |
| 1,832,665 | Spaine | Nov. 17, 1931 |
| 1,878,824 | Dodge | Sept. 20, 1932 |
| 2,498,291 | Nadai | Feb. 21, 1950 |
| 2,558,679 | Gressel et al. | June 26, 1951 |
| 2,634,370 | Carlson | Apr. 7, 1953 |
| 2,730,891 | Frederick et al. | Jan. 17, 1956 |